March 31, 1931.  D. A. WILLERTON  1,799,033
HAY LOADER
Filed May 3, 1930  3 Sheets-Sheet 3
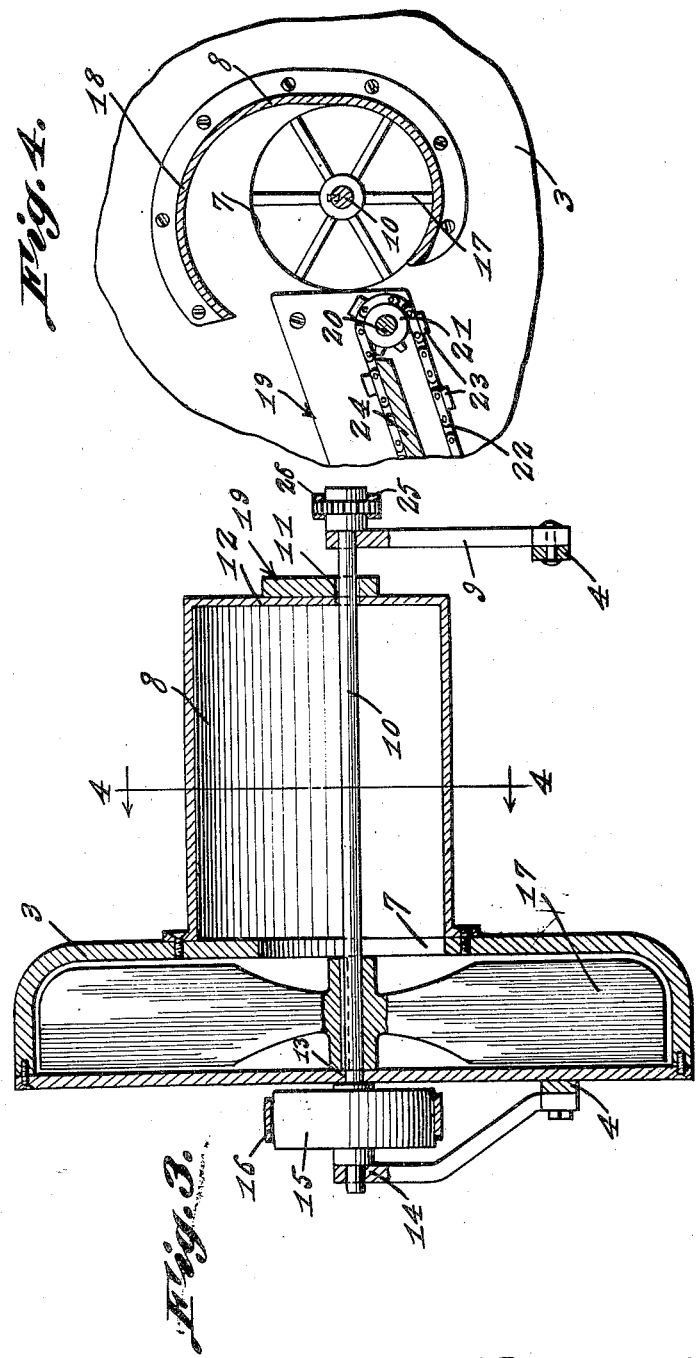

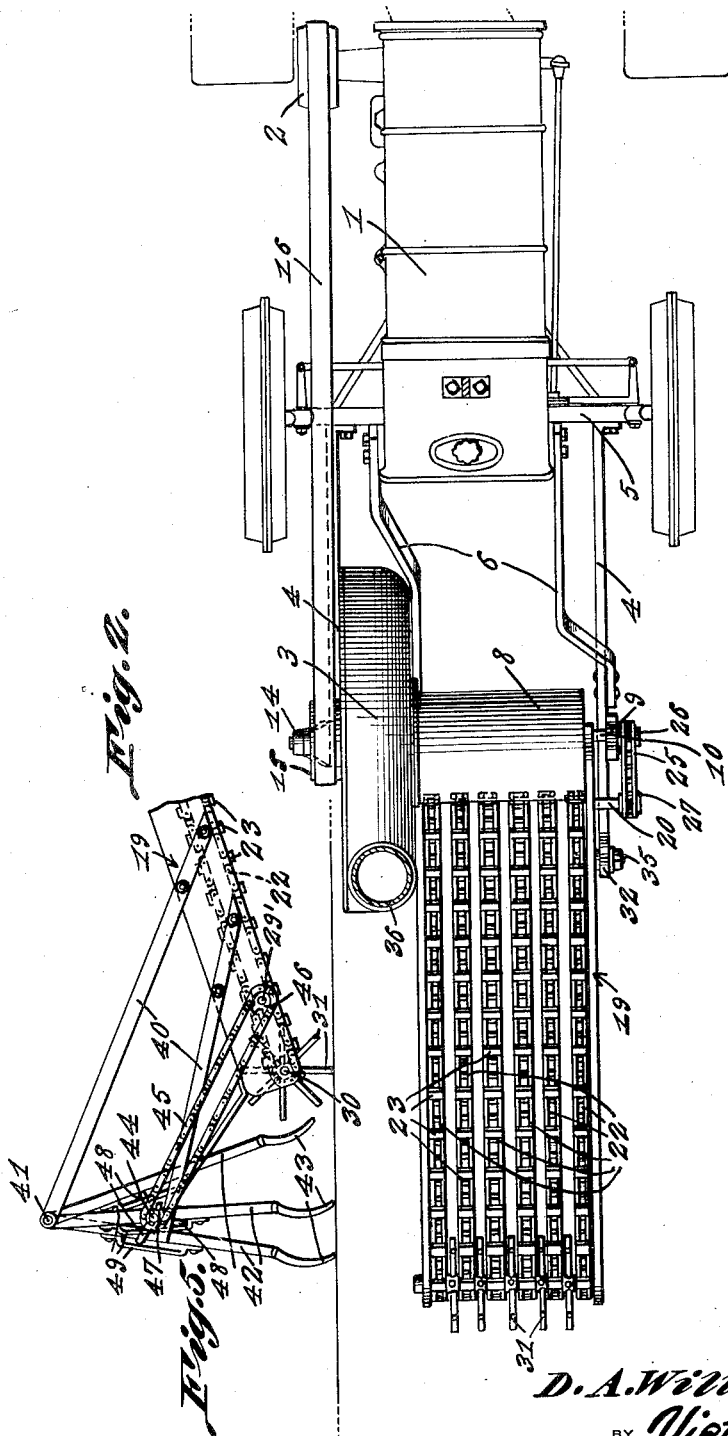

Patented Mar. 31, 1931

1,799,033

UNITED STATES PATENT OFFICE

DORIAN A. WILLERTON, OF ST. CLAIRSVILLE, OHIO

HAY LOADER

Application filed May 3, 1930. Serial No. 449,554.

This invention relates to a hay loader for use in connection with a tractor and has as its primary object to provide a loader which may be readily installed upon any tractor of the ordinary type and driven from the engine of the tractor and by which hay may be readily taken up from the ground surface and delivered to a wagon or truck and which loader will be highly efficient in its operation.
Another object of the invention is to provide a hay loader for use in connection with a tractor and which loader will be so constructed and adapted to be so mounted upon the tractor as to in no way interfere with travel of the tractor or with the operator's vision.

Another object of the invention is to provide a hay loader so constructed that it will have no tendency to over-balance the tractor upon which it is mounted and therefore will in no way interfere with the steering of the tractor.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 2 is a top plan view.
Figure 3 is a vertical transverse sectional view taken substantially on the line 3—3 of Figure 1, looking in the direction indicated by the arrows.

Figure 4 is a vertical front to rear sectional view taken substantially on the line 4—4 of Figure 3 looking in the direction indicated by the arrows.

Figure 5 is a fragmentary view in side elevation illustrating a slight modification of the invention.

Figure 1:
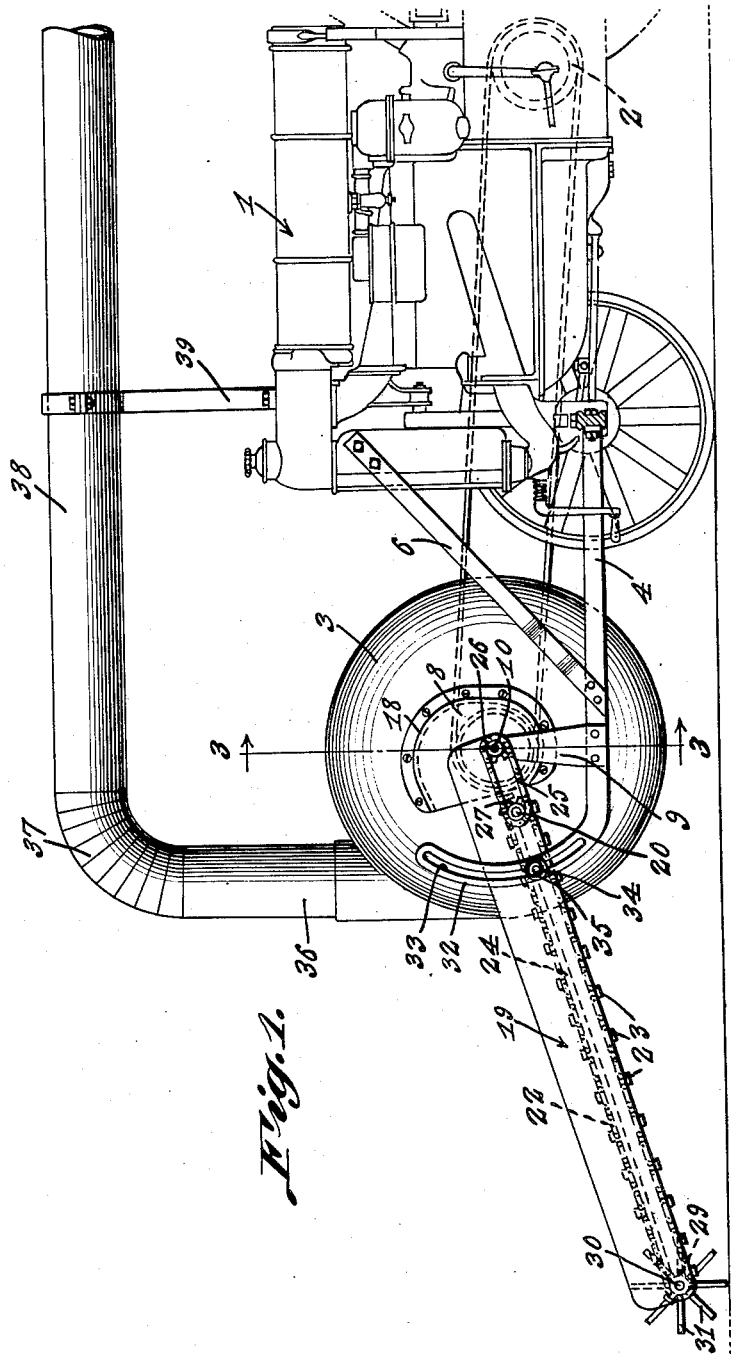
Figure 1 is a view in side elevation of the hay loader embodying the invention.

In the drawings, the numeral 1 indicates in general the tractor in connection with which the loader of the present invention is employed, and this tractor is of the ordinary type, the tractor being of course motor driven and a pulley 2 being mounted upon the power shaft and employed, in a manner to be presently explained, in driving the loader.

The loader includes, in its structure, a suction fan, the casing of which is indicated by the numeral 3, and this casing is mounted in a frame including side bars 4, preferably secured to the front axle 5 of the tractor, and upwardly inclined bars 6 which may be secured to the opposite sides of the body of the tractor at any convenient point. The casing 3 of the suction fan is provided in its side which is presented inwardly, with a draft opening 7, and a drum 8 is mounted upon this side of the casing and is open at one end and secured at its said end to the said side of the casing 3 so that this end of the drum will be in communication with the interior of the suction fan casing by way of the opening 7. A bearing 9 is mounted upon one of the side members 4 of the frame structure and a shaft 10 is journalled at one end in this bearing and extends through an opening 11 in a closed end 12 of the drum 8, and the other end of this shaft extends through an opening 13 in the other side wall of the casing 3 and is journalled in a bearing bracket 14 mounted upon the other side member 4 of the frame.

A pulley 15 is fixed upon the shaft 10 and a belt 16 is trained about this pulley and about the pulley 2 so that rotary motion is imparted to the shaft when the engine is in operation. The numeral 17 indicates the fan which is fixed upon the shaft within the casing 3 and the fan blades are so positioned and the shaft 10 is so rotated as to create a suction within the casing through the opening 7. By reference to Figure 4 of the drawings, it will be observed that the lower portion of the drum 8 is of arcuate form and substantially concentric to the shaft 10 and above this portion, the drum is extended upwardly and thence curved forwardly as indicated by the numeral 18 and the said drum is open at its forward side so that air may pass into the drum and through the opening 7, in the operation of the fan.

The numeral 19 indicates, in general, an endless conveyor which may be any of the ordinary types and which includes a shaft 20 having sprockets 21 thereon over which endless chains 22 are trained, and, slats 23 are mounted at their ends upon the chains to extend between the same and travel over a partition board 24 which extends between the side members of the frame in which the conveyor mechanism is mounted. A sprocket chain 25 is trained about a sprocket gear 26 upon the end of the shaft 10 which is journalled in the bearing 9 and about another sprocket gear 27 which is fixed upon one end of the shaft 20. The sprocket chains 22 also are trained about gears 28 fixed upon a shaft 29 mounted in the lower end of the frame of the conveyor and a shaft 30 is mounted below and in front of the shaft 29 and carries a number of picker fingers 31.

The conveyor frame is of course movable about the shaft 10 and in order that the frame may be held at the proper angle of inclination, that one of the side members 4 of the main frame which is located at the same side of the endless conveyor as the chain 25 and sprockets 26 and 27, is provided at its forward end with an upwardly extending arcuate arm, this arm being indicated by the numeral 32 and being formed with a longitudinal slot 33, and a bolt 34 is mounted upon one of the side members of the conveyor frame and extends through the slot and has a nut 35 thereon which may be adjusted to hold the bolt at any point in the length of the slot, and therefore maintain the conveyor frame in the desired position of inclination. It will be observed by reference to Figure 4 that the upper end of the endless conveyor is presented to the open side of the hood 8 at the lower portion of said side and therefore hay, which is picked up by the pickers 31 and delivered onto the upper stretch of the endless conveyor, will be delivered into the drum 8 through the said open front thereof and as a suction force is created by the fan, the hay will be drawn, by suction, through the opening 7 and delivered through the spout 36 which extends vertically from the casing 3 at the forward side thereof and is connected by an elbow 37 to a tube 38 which is supported by a bracket 39 to extend longitudinally rearwardly above the tractor and the rear end of this tube is preferably so positioned that a truck, connected at the rear of the tractor and drawn thereby, may receive the hay which is in this manner gathered.

While the picker unit 31 is efficient in operation, I might find it advisable to employ, in addition thereto, a rake unit which is illustrated in detail in Figure 5 of the drawings. This rake unit comprises a frame structure 40 which is mounted upon the frame of the endless conveyor, and between the upper and forward ends of the upper members of the frame, there is mounted a rod 41 from which are suspended arms 42 carrying rake teeth 43 at their lower ends, these teeth being curved so that their gathering ends are presented in a general downward and rearward direction. A crank shaft 44 is mounted in the frame 40 and driven by a sprocket chain 45 passing over a sprocket 46 upon the conveyor shaft 29' and over a sprocket gear 47 upon the shaft 44 so that this shaft is rotated in consonance with the operation of the endless conveyor and the picker unit above described. Front and rear swinging movement of the arms 42 is effected by cranks 48 which operate in yokes 49 mounted longitudinally upon the forward edges of the arms and it will be understood, at this point, that in the rocking or swinging movement of the arms, the teeth 43 will gather the hay which is strewn on the ground surface and direct the same to the picker unit.

What I claim is:—

1. In a hay loader for use in connection with a tractor, a frame for attachment to the front of a tractor, a suction fan, to be driven from the engine of the tractor, mounted at one side of said frame, a delivery pipe leading from the casing of the fan and above the tractor, a hay receiving drum mounted at one side of the fan casing and open at its front and in communication, at one end, with the intake of said casing, an endless conveyor mounted in the frame and having its delivery end presented to the said open front of the drum, and a rotary picker unit at the lower end of the endless conveyor, driven from the conveyor.

2. In a hay loader for use in connection with a tractor, a frame for attachment to the front of a tractor, a suction fan, to be driven from the engine of the tractor, mounted at one side of said frame, a delivery pipe leading from the casing of the fan and above the tractor, a hay receiving drum mounted at one side of the fan casing and open at its front and in communication, at one end, with the intake of said casing, an endless conveyor mounted in the frame and having its delivery end presented to the said open front of the drum, a rotary picker unit at the lower end of the endless conveyor, driven from the conveyor, an assemblage of swinging forks supported in advance of the picker unit, and means for actuating said forks, driven from the conveyor.

3. In a hay loader for use in connection with a tractor, a frame for attachment to the front of a tractor, a suction fan to be driven from the engine of the tractor, mounted at one side of said frame, a delivery pipe leading from the casing of the fan and above the tractor, the casing having an opening in one side, a hay receiving drum mounted upon the said side of the casing and in communication with the casing by way of said opening, the said drum being open at its front, an endless conveyor mounted in the frame and having its delivery end presented to the said open front of the drum, and a rotary picker unit at the lower end of the endless conveyor, driven from the conveyor.

In testimony whereof I affix my signature.

DORIAN A. WILLERTON.